(12) United States Patent
Marsico et al.

(10) Patent No.: US 7,738,488 B2
(45) Date of Patent: Jun. 15, 2010

(54) METHODS, SYSTEMS, AND COMPUTER PROGRAM PRODUCTS FOR PROVIDING WIRELESS-FIDELITY (WI-FI) GATEWAY VISITOR LOCATION REGISTER (VLR) FUNCTIONALITY

(75) Inventors: Peter J. Marsico, Chapel Hill, NC (US); Venkataramaiah Ravishankar, Cary, NC (US)

(73) Assignee: Tekelec, Morrisville, NC (US)

( * ) Notice: Subject to any disclaimer, the term of this patent is extended or adjusted under 35 U.S.C. 154(b) by 1151 days.

(21) Appl. No.: 11/227,427

(22) Filed: Sep. 15, 2005

(65) Prior Publication Data

US 2006/0079228 A1 Apr. 13, 2006

Related U.S. Application Data

(60) Provisional application No. 60/610,111, filed on Sep. 15, 2004.

(51) Int. Cl.
*H04J 3/22* (2006.01)
(52) U.S. Cl. ............... 370/466; 370/401; 370/315; 370/328; 455/426.2; 455/11.1
(58) Field of Classification Search .......... 455/446, 455/436, 406, 432.1; 370/401, 315, 325, 370/326, 328
See application file for complete search history.

(56) References Cited

U.S. PATENT DOCUMENTS 6,195,555 B1 2/2001 Dent 6,411,632 B2 6/2002 Lindgren et al.

(Continued)

FOREIGN PATENT DOCUMENTS

EP 1 199 842 4/2002

(Continued)

OTHER PUBLICATIONS

"Cisco IP Transfer Point as the Signaling Gateway for the Cisco BTS 10200 Softswitch," Cisco Systems, Inc., pp. 1-10 (Summer 2004).

(Continued)

*Primary Examiner*—Charles N Appiah
*Assistant Examiner*—Randy Peaches
(74) *Attorney, Agent, or Firm*—Jenkins, Wilson, Taylor & Hunt, P.A.

(57) ABSTRACT

Methods, Systems, and Computer Program Products for Providing Wireless-Fidelity (Wi-Fi) Gateway Visitor Location Register (VLR) Functionality. A method is disclosed herein for providing Wi-Fi gateway VLR functionality for an access point in a Wi-Fi network. The steps of the method can occur at a Wi-Fi gateway VLR that can perform VLR functions for at least one access point in a Wi-Fi network. The VLR functions can include receiving a registration request from a subscriber located in a service area of an access point in the Wi-Fi network. Further, the VLR functions can include authenticating the subscriber with a home location register (HLR) associated with the cellular network. The VLR functions can also include receiving information associated with the subscriber from the HLR. The Wi-Fi gateway VLR can store the information associated with the subscriber and maintain Wi-Fi reachability information for sending media packets to the subscriber in the Wi-Fi network.

68 Claims, 7 Drawing Sheets

U.S. PATENT DOCUMENTS

| | | | |
|---|---|---|---|
| 6,418,319 | B1 | 7/2002 | Dent |
| 6,542,716 | B1 | 4/2003 | Dent et al. |
| 6,545,987 | B1 | 4/2003 | Becher |
| 6,546,242 | B1 | 4/2003 | Alperovich et al. |
| 6,600,734 | B1 | 7/2003 | Gernert et al. |
| 6,611,684 | B1 | 8/2003 | Franks |
| 6,611,692 | B2 | 8/2003 | Raffel et al. |
| 6,708,031 | B2 | 3/2004 | Purnadi et al. |
| 2003/0051041 | A1 | 3/2003 | Kalavade et al. |
| 2003/0139180 | A1 | 7/2003 | McIntosh et al. |
| 2003/0169713 | A1 | 9/2003 | Luo |
| 2004/0002335 | A1 | 1/2004 | Pan et al. |
| 2005/0083971 | A1 | 4/2005 | Delaney et al. |
| 2005/0122941 | A1* | 6/2005 | Wu et al. ............ 370/338 |
| 2005/0186960 | A1* | 8/2005 | Jiang ............ 455/435.1 |
| 2006/0025126 | A1* | 2/2006 | Lu et al. ............ 455/426.1 |
| 2006/0052113 | A1* | 3/2006 | Ophir et al. ............ 455/456.1 |

FOREIGN PATENT DOCUMENTS

| | | |
|---|---|---|
| WO | WO 03/063404 | 7/2003 |

OTHER PUBLICATIONS

"Cisco IP Transfer Point as the. Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
UMA Technology: Overview, http://unmatechnology.org/overview/index.htm, pp. 1-2 (2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Kewney, "News—Palm Goes for Voice Over WiFi and Internet—Using Cisco Tech," pp. 1-3 (May 30, 2003).
"Stu's Weblog," pp. 1-2 (May 17, 2003).
Moodie, "Agilent acceSS7: White Paper," Agilent Technologies, pp. 1-14 (Apr. 1, 2003).
Tehrani, "The Rise of Enterprise WiFi Telephony," Internet Telephony Publisher's Outlook, pp. 1-5 (Mar. 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN SIM Authentication and Authorization," Cisco Systems, Inc., pp. 1-13 (Copyright 1992-2003).
"First Public WLAN to GSM Network Aggregation Service Launched as WeRoam® Goes Commercial with Transat Software," Transat Technologies, pp. 1-2 (Nov. 23, 2002).
Werbach, "Sifry's Alerts: Kevin Werbach on Wifi PBXs," pp. 1-2 (Oct. 10, 2002).
Werbach, "Open Spectrum: The New Wireless Paradigm," New America Foundation, pp. 1-20 (Oct. 2002).
Orzech, "WLAN Software Turns PDAs Into Cell Phones," pp. 1-2 (Sep. 18, 2002).
Griffith, "The Marriage of WLAN to GSM," pp. 1-2 (Aug. 22, 2002).
Blackwell, "Inter-network Roaming," pp. 1-4 (Jun. 28, 2002).
Sutherland, "Mobile Carriers Weave Wi-Fi," pp. 1-3 (May 17, 2002).
"Sifry's Alerts: Transat Technologies Raises $6 Million Series A," pp. 1 (May 7, 2002).
Blackwell, "Wireless Anywhere—Even Miles from an Access Point?" pp. 1-3 (Apr. 22, 2002).
Liu, "Deutsche Telekom to Integrate Cell/WLAN Service," pp. 1-2 (Mar. 8, 2002).
Barry, "A Signal for Savings," Packet, Cisco Systems Users Magazine, vol. 14, No. 4, pp. Cover; 19-21; and 81 (Fourth Quarter 2002).
"Agilent Technologies and Cisco Systems SS7 over IP White Paper," Cisco Systems, Inc. and Agilent Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Aggregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
*allNetDevices Staff*, "Antenna Combines WLAN, Cellular, GPS," p. 1 (Dec. 5, 2001).
Haskin, "Global Roaming Breakthrough Claimed," http://www.internetnews.com/wireless/print.php/900871, pp. 1-2 (Oct. 10, 2001).
Peretz, "COPS to Enable Global Roaming Across Cellular And WLANs," p. 1 (Oct. 9, 2001).
"Agilent acceSS7 Business Intelligence," Agilent Technologies, pp. 1-6 (Copyright 2001—Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Heinei, "GSM Networks: Protocols, Terminology, and Implementation, *Scenarios*," Mobile Communications Series, pp. 233-250 (1999).
"Topsail Beach—SS7 Over IP—" Cisco Systems, Inc., pp. 1-16 (Copyright 1999).
"Chapter 1: Overview," SS7 Port Adapter Installation and Configuration, pp. 1-1-1-8 (Publication Date Unknown).
"Configuring ITP Basic Functionality," IP Transfer Point, Cisco IOS Release 12.2(4)MB12, pp. 31-50 (Publication Date Unknown).
"Configuring ITP Optional Features," IP Transfer Point, Cisco IOS Release 12.2(4)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
"GSM Signaling Platform: WLAN and GSM Interconnection Application," Performance Technologies, pp. 1-2 (Publication Data Unknown).
"Seamless WLAN/GSM Roaming on All Enabled Hotspots Worldwide," WERoam, pp. 1-4 (Publication Data Unknown).
"Voice-over-IP Network Appliance," WiFi® Phone, pp. 1-5 (Publication Date Unknown).
"Wireless LAN the Easy Way: Transat Introduces the Affordable Solution for WLAN-enabled 3G Services," pp. 1-2 (Publication Data Unknown).
"CORBA® Basics," Object Management Group, http://www.omg.org/gettingstarted/corbafaq.htm, pp. 1-5 (May 26, 2005).
Notification of Transmittal of the International Search Report and the Written Opinion of the International Searching Authority, or the Declaration for International Application No. PCT/US05/32834 (Jul. 11, 2008).

\* cited by examiner

METHODS, SYSTEMS, AND COMPUTER PROGRAM PRODUCTS FOR PROVIDING WIRELESS-FIDELITY (WI-FI) GATEWAY VISITOR LOCATION REGISTER (VLR) FUNCTIONALITY

RELATED APPLICATIONS

This application claims the benefit of U.S. Provisional Patent Application Ser. No. 60/610,111, filed Sep. 15, 2004; the disclosure of which is incorporated herein by reference in its entirety.

TECHNICAL FIELD

The subject matter disclosed herein relates to methods, systems, and computer program products providing communications services through wireless networks. More particularly, the subject matter disclosed herein relates to methods, systems, and computer program products for integrating Wireless Local Area Network (WLAN) and cellular network based systems.

BACKGROUND ART

Communications services have historically been provided over wireline networks such as the Public Switched Telephone Network (PSTN). Currently, communications services are also provided over a wide variety of wireless networks such as cellular networks and WLANs. Common cellular network formats include Global System for Mobile Communication (GSM) networks and Interim Standard 41 (IS41) networks. WLANs utilize technologies, such as IEEE™ standards 802.11, 802.11a, 802.11b, and 802.11g, Wireless-Fidelity (Wi-Fi) supported by the Wireless Ethernet Compatibility Alliance, BLUETOOTH™ supported by Bluetooth SIG, Inc., Home Radio Frequency (HomeRF) supported by HomeRF Working Group Inc., High Performance Radio Local Area Network (HiperLAN) developed by the European Telecommunications Standards Institute, and the like.

A wireless communication device, such as a mobile telephone, typically communicates in a cellular network by detecting some form of beacon signal transmitted by one of a plurality of Base Transceiver Stations (BTSs) and then synchronizing itself to that BTS. BTSs include radio transceivers that define a geographic region, known as a cell or wireless service area, and coordinates radio link protocols with wireless communication devices. The BTSs are the networking components of a cellular network from which all signals are sent and received. All BTSs in a cellular network are connected to a Mobile Switching Center (MSC) by landline or microwave links. The MSC controls the switching between the Public Switched Telephone Network (PSTN) and the cell site for all wireline-to-mobile and mobile-to-wireline calls. The MSC also processes mobile unit status data received from the cell-site controllers, switches calls to other cells, processes diagnostic information, and compiles billing statistics.

Roaming refers to the ability of a wireless communication device to move from the coverage of one wireless service area to another wireless service area without interruption in service or loss of connectivity. The North American Cellular Network (NACN) is an organization of cellular providers that facilitates cellular calls across the United States to be linked for seamless roaming. The components of the NACN include switches, Home Location Registers (HLRs), Authentication Centers (AuCs), Equipment Identify Registers (EIRs), Visitor Location Registers (VLRs), service control points, and other intelligent peripherals. An HLR is a database for storing a subscriber's feature profile, such as the Mobile Identification Number (MIN), Electronic Serial Number (ESN) of the wireless communication device, and the features of the customer (such as call forwarding, call waiting, 3-way calling, voice mail, etc.). In a GSM cellular network, the AuC includes functionality that is responsible for authenticating information provided by the subscriber identification module (SIM) card of each wireless communication device that attempts to connect to the GSM core network (typically when the phone is powered on). Once the authentication is successful, the HLR is allowed to manage the wireless communication device, SIM, and other services provided by the network. The AuC may be co-located with an HLR. An EIR function may be used to determine whether a wireless communication device has been banned from the network, such as when a wireless communication device is reported as stolen. The EIR function may be co-located with an HLR. A VLR is a network database, which is typically associated with an MSC that serves a particular geographic service area. A VLR temporarily stores information and provides mobility management functions related to those mobile subscribers that are being served by the associated MSC. A VLR is adapted to notify a mobile subscriber's HLR in response to the mobile subscriber entering the VLR's service area. In a GSM network, a MAP UpdateLocation message is used by a VLR to notify a mobile subscriber's HLR that the subscriber has entered into the VLR's service area. The VLR can include information, such as MIN and ESN, about a roaming wireless communication device. A VLR can be a part of the MSC.

WLANs can be used to provide Internet or other network access to mobile communication devices, such as laptops, personal digital assistants (PDAs), and smartphones. WLAN-enabled communication devices can communicate with a WLAN via one or more access points that act as a communication hub for the WLAN-enabled device to communicate with a wired network. A hotspot is a geographic area in which an Access Point (AP) provides public wireless broadband network services to communication devices through the WLAN. Hotspots are commonly located in heavily populated areas such as airports, train stations, libraries, marinas, conventions centers, shopping malls, and hotels. WLAN-enabled devices can roam between hotspots.

WLAN service subscribers can be provided subscription management and authentication, authorization, and accounting (AAA) services by an application service provider (ASP) aggregator. An ASP aggregator is a third party entity that can allow subscribers to access WLAN services at multiple hotspots with a single subscription. Several APs can be connected to an AAA server for providing WLAN services to multiple hotspots. Typically when a WLAN-enabled device attempts to connect to a WLAN, a username and password must be provided to pass to the AAA server. The AAA server can then pass the username and password to an HLR, which checks that the username and password is acceptable and then authorizes access to the WLAN.

An AAA server handles user requests for access to computer resources and, for an enterprise network, provides AAA services. The AAA server typically interacts with network access and gateway servers and with databases and directories containing user information. Remote Authentication Dial-In User Service (RADIUS) is a client/server protocol and software that enables access points to communicates with AAA servers. The AAA server uses GSM Mobile Application Part (MAP) protocols to communicate with HLRs to authenticate WLAN users and authorize their access to requested WLAN service. RADIUS allows an ASP aggregator to maintain user profiles in a central database that all remote servers can share.

Currently, access to cellular networks can be provided at hotspots. This service enables a subscriber to a cellular network to roam into the hotspot coverage area and receive service to the cellular network. The cellular service is provided by linking to the HLR of the cellular network in order to authenticate the subscriber. Each time AAA, mobility management (e.g., roaming), or billing service is required, the cellular network must be accessed, which can place a significant burden on cellular network resources.

Accordingly, there exists a need for improved integration of Wireless Local Area Network (WLAN) and cellular network based systems.

SUMMARY

According to one aspect, the subject matter disclosed herein includes a method for providing Wireless-Fidelity (Wi-Fi) gateway Visitor Location Register (VLR) functionality for an access point in a Wi-Fi network. The Wi-Fi network may utilize technologies such as IEEE standards 802.11, 802.11a, 802.11b, 802.11g, and 802.16. The term "Wi-Fi" as used herein is intended to refer to any of the IEEE 802.11x family of protocols or any other protocol used to deliver media packets to a wireless device. According to the method, a Wi-Fi gateway VLR may be provided for performing VLR functions for the access point in a Wi-Fi network. The VLR functions include receiving a registration request from a subscriber located in a service area of an access point in the wireless local area network may be received at a gateway located between a Wi-Fi network. The VLR functionality may be deployed in a signaling gateway network element, such as an SS7-Internet protocol (IP) signaling gateway. Alternatively, the VLR functionality may be deployed in a softswitch or media gateway controller (MGC). In response to the registration, the subscriber can be authenticated with a home location register (HLR) associated with the cellular network. Information associated with the subscriber may be received from the HLR. The information associated with the subscriber may be stored in the Wi-Fi gateway VLR. The Wi-Fi gateway VLR may maintain Wi-Fi reachability information for sending media packets to the subscriber in the Wi-Fi network.

According to another aspect, the subject matter described herein includes a method for establishing communication with a subscriber who is roaming in a Wi-Fi network. Steps in the method can occur at an HLR associated with a cellular network. The method can include receiving registration information from a Wi-Fi gateway VLR providing VLR functions for at least one access point in the Wi-Fi network. The VLR functions can include providing Wi-Fi reachability information for sending media packets to a subscriber being serviced by an access point in a Wi-Fi network. Further, the method can include receiving a request from a first network for reachability information for the subscriber. The Wi-Fi gateway VLR can be queried for routing information for the subscriber. The routing information can then be obtained and provided to the first network.

The subject matter described herein for providing Wi-Fi gateway VLR functionality may be implemented using a computer program product comprising computer executable instructions embodied in a computer readable medium. Exemplary computer readable media suitable for implementing the subject matter described herein include disk memory devices, programmable logic devices, application specific integrated circuits, and downloadable electrical signals. In addition, a computer readable medium that implements the subject matter described herein may be distributed across multiple physical devices and/or computing platforms.

BRIEF DESCRIPTION OF THE DRAWINGS

Exemplary embodiments of the presently disclosed subject matter will now be explained with reference to the accompanying drawings, of which.

DETAILED DESCRIPTION

In accordance with the subject matter disclosed herein, systems, methods, and computer program products are provided for integrating cellular network based systems and Wireless Local Area Network (WLAN), such as Wireless-Fidelity (Wi-Fi) network. Cellular network and WLAN integration can include their roaming, Authentication, Authorization, and Accounting (AAA), calling, Short Message Service (SMS), and billing systems. One or more embodiments are directed to a gateway that enables a wireless operator to provide WLAN service to cellular network subscribers with a single bill and account. A Wi-Fi gateway Visitor Location Register (VLR) can integrate AAA, billing, and usage and measurements mechanisms of cellular networks with AAA, billing, and usage and measurements mechanisms used in Wi-Fi networks. In addition, the Wi-Fi gateway VLR can support messaging services, such as SMS or multimedia message service (MMS), communication and roaming between cellular networks and WLANs.

According to one embodiment of the subject matter disclosed herein, a Wi-Fi gateway VLR function that is adapted to provide internetworking services between Wi-Fi and cellular networks. To an access point in a Wi-Fi network, the Wi-Fi gateway VLR function may appear as an AAA server, while the gateway function may appear as a VLR to node (e.g., HLRs, MSCs, and AuCs) in a cellular network.

According to another embodiment of the subject matter disclosed herein, the Wi-Fi gateway VLR function is adapted to enable cellular network-based authentication of subscribers roaming in a Wi-Fi. A VLR or Wi-Fi gateway VLR function associated is adapted to assign a temporary cellular network identifier, such as a GSM Mobile Subscriber Roaming Number (MSRN) to a roaming Wi-Fi subscriber. The Wi-Fi gateway VLR function is adapted to communicate the temporary cellular network identifier along with other cellular network mobility management and routing information to the subscriber's HLR and other cellular network elements. The Wi-Fi gateway VLR may maintain a mapping of temporary cellular network identifiers and the corresponding Wi-Fi access point that is servicing the subscriber associated with the temporary identifier. As such, continual communication of roaming Wi-Fi subscriber mobility management update information to a cellular network HLR may not be necessary. A Wi-Fi gateway VLR function may operate in conjunction with a packet switching system, such as a media gateway controller or media gateway, to facilitate the origination of calls from a cellular subscriber roaming in a Wi-Fi, as well as the termination of calls to a cellular subscriber that is roaming in a Wi-Fi.

Figure 1:
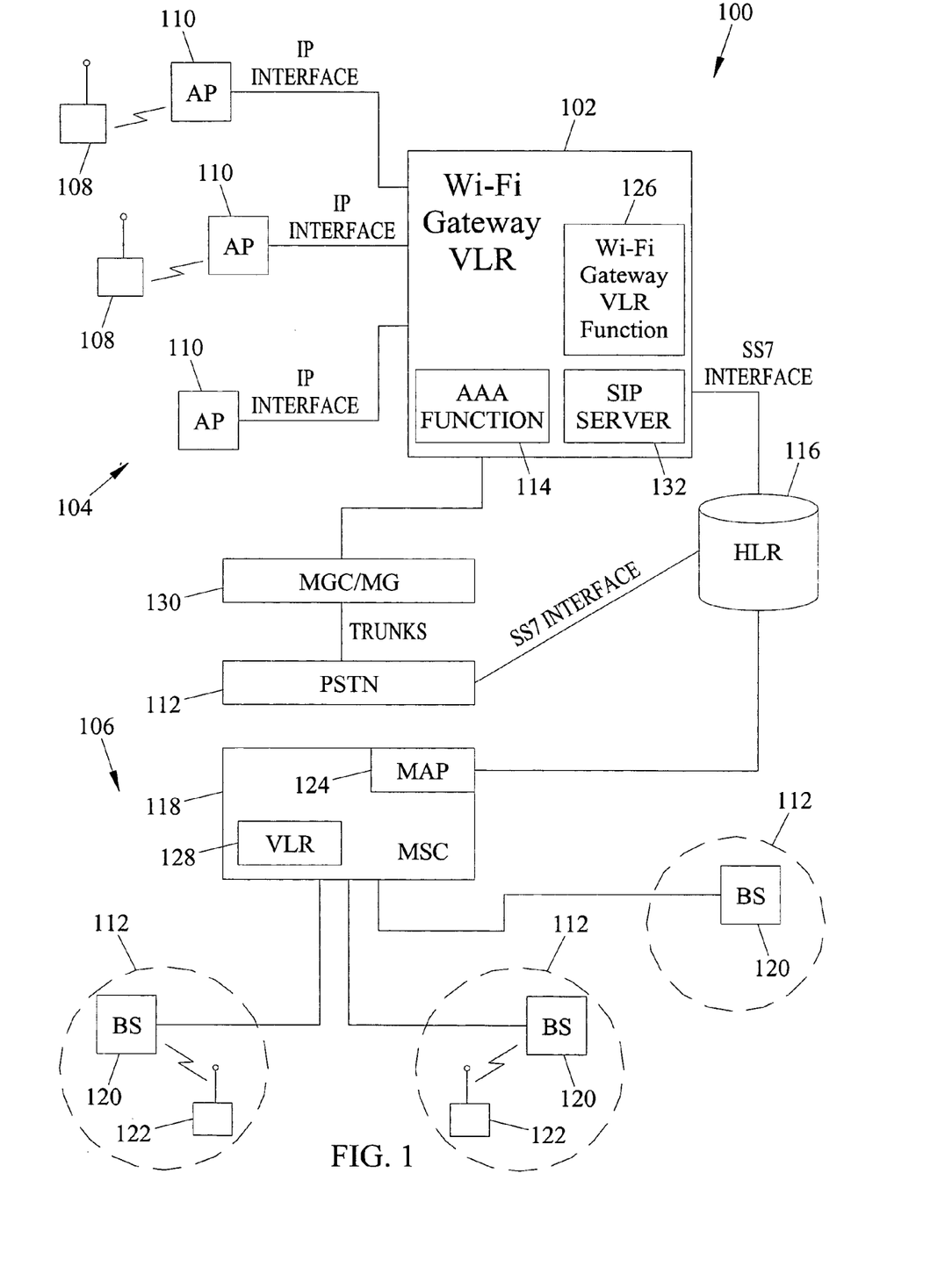
FIG. 1 is a schematic diagram illustrating an exemplary distributed network communication system including a Wireless-Fidelity (Wi-Fi) gateway Visitor Location Register (VLR) for integrating roaming, AAA, and, billing systems of a Wi-Fi network and a Global System for Mobile Communications (GSM) network according to an embodiment of the subject matter described herein.

FIG. 1 is a schematic diagram illustrating an exemplary distributed network communication system, generally designated 100, including a Wi-Fi gateway VLR 102 for integrating roaming, AAA, billing, and usage and measurements systems of a Wi-Fi network (generally designated 104) and a Global System for Mobile Communications (GSM) network (generally designated 106). Wi-Fi gateway VLR 102 can provide connection between Wi-Fi network 104 and GSM network 106. Wi-Fi 104 network may utilize technologies such as IEEE standards 802.11, 802.11a, 802.11b, 802.11g, and 802.16. Although the gateway VLRs, systems, and methods are described herein with regard to Wi-Fi and GSM networks, it is envisioned that these gateways, systems, and methods can also be similarly applied to other suitable types of WLANs and cellular networks. For example, the methods and systems described herein can provide connection between any of the WLAN protocols described herein and any other type of cellular network, such as an ANSI IS-41 network.

Wireless communication devices 108 can wirelessly communicate in Wi-Fi network 104 via a plurality of Access Points (APs) 110. Each AP 110 can provide service to a geographic region known as a hotspot, and may be assigned a network address such as an Internet protocol (IP) address. Each AP 110 may also include wired communications capabilities, such as Ethernet capabilities. APs 110 can have a wireless transceiver that operates according to various wireless standards, such as wireless Ethernet based on the Institute of Electrical and Electronics Engineers (IEEE) 802.11 standard. Devices 108 can be any of various types of devices, including a computer system, such as a portable computer, a personal digital assistant (PDA), an Internet appliance, a mobile or cellular telephone, or other wired or wireless device. Devices 108 can also include various wireless or wired communication devices, such as a wireless Ethernet card, paging logic, RF communication logic, a wired Ethernet card, a modem, a DSL device, an ISDN device, an ATM device, a parallel or serial port bus interface, or other type of communication device.

Wi-Fi network 104 may include a wired network, a wireless network, or a combination of wired and wireless networks. For example, Wi-Fi network 104 can be a standard "wired" Ethernet network, which connects each AP 110 together. Wi-Fi network 104 is coupled to GSM network 106 via Public Switched Telephone Network (PSTN) 112.

Each AP 110 may store information used to identify or select a network provider for a particular user, as well as related access information to enable the network provider to provide access. When in sufficiently close range to AP 110, communication device 108 can access network system 100 using a particular network provider, as discussed further below. A user operating one of communication devices 108 can communicate with one of access points 110 to gain access to network services, such as Internet access. Communication devices 108 may have a wireless communication card or chipset, e.g., a wireless Ethernet card, for wirelessly communicating with one of APs 110. Alternatively, device 108 can have a wired communication device, e.g., an Ethernet card, for wired communication with AP 110.

Each communication device 108 can include a memory for storing the identification information indicating an Internet Service Provider (ISP) to which the user has subscribed. The indicated ISP can be one of a plurality of possible network providers that provide Internet access, telephone services, or other network services. The identification information can be a system ID (an 802.11 System ID), a Media Access Control (MAC) ID of a wireless Ethernet device comprised in the device, the name of the ISP, or other type of information that uniquely identifies one (or more) network providers. The identification information can be contained in a digital certificate, which can be stored in a web browser or in a memory medium of the device.

According to one embodiment, communication devices 108 register with Wi-Fi network 104 by transmitting an authentication request, including identification information, to an AAA functionality 114 associated with Wi-Fi gateway VLR 102. Communication devices 108 can register to an ISP via Wi-Fi network 104 by using Session Initiated Protocol (SIP). Communication devices 108 and AAA functionality 114 can utilize RADIUS for authentication and accounting. RADIUS specifies a mechanism for authenticating a remote user into the network through an attribute/value pair such as a login name and a password. In addition, RADIUS allows a service provider to maintain subscriber profiles for access by remote servers.

AAA functionality 114 can convert the RADIUS protocol information from each communication device 108 to Mobile Application Part (MAP) protocol and perform authorization using a GSM protocol against subscription records in a Home Location Register (HLR) 116. According to one embodiment of the subject matter disclosed herein, HLR 116 is a database for storing subscriber information and for providing GSM Authentication Center (AuC) and EIR functionality. HLR 116 can be linked to Wi-Fi network 104, GSM network 106, and other suitable networks so that subscriber information may be shared between the networks. HLR 116 can check that the identification information is correct, and transmit information to AAA functionality 114 that can be utilized for allowing or disallowing communication device 108 access to Wi-Fi network 104. MAP provides a mechanism for enabling wireless subscriber information to be passed between Wi-Fi network 104 and GSM network 106. MAP parameters used to authenticate a communication device or subscriber may include, but are not limited to, a Mobile Identification Number (MIN), a Mobile Subscriber ISDN (MSISDN), an International Mobile Station Identifier (IMSI), a Temporary Mobile Subscriber Identifier (TMSI), a Local Mobile Subscriber Identifier (LMSI), an International Mobile Equipment Identifier (IMEI), or other identifier associated with a subscriber or the subscriber's communication device.

If communication device 108 is allowed access to Wi-Fi network 104, AAA function 114 may generate an accounting message or a Call Detail Record (CDR) for billing/billing verification, and usage measurements. As used herein, the term usage measurements is intended to represent the collection of subscriber registration and/or call related information that may be used for any number of reporting and planning purposes. For instance, such usage measurements information may be highly useful to network operators that wishes to monitor network Wi-Fi versus cellular network usage trends among their subscriber bases. This type of information/usage measurements reporting capability would be a valuable tool for network operators that are planning future network expansion/growth. With regard to billing/billing verification, the collected data may be used, for example, to verify a service level access agreement between a cellular network operator and a Wi-Fi network operator. A CDR is a data record containing information related to the communication, such as the origination and destination addresses of the call, the time the call started and ended, the duration of the call, or any added toll or operator charges. The accounting message can be transmitted to a Wi-Fi gateway VLR function 126 or a billing function. The accounting message can include communication information, such as the origination and destination addresses of the call, the time the call started and ended, the duration of the call, and any added toll or operator charges.

In the illustrated example, cellular network 106 is implemented using Time Division Multiple Access (TDMA)-based GSM communications technology. Alternatively, cellular network 106 can be implemented with a digital communication technology including Wideband Code Division Multiple Access (WCDMA), Code Division Multiple Access-3rd Generation (CDMA2000), and the like. Cellular network 106 can also be implemented with any suitable analog technology such as Advance Mobile Phone System (AMPS), Extended AMPS (EAMPS), and Narrowband AMPS (NAMPS).

Cellular network 104 can include a Gateway Mobile Switching Center (GMSC) 118. One or more service providers can be in communication with MSC 118. MSC 118 can be connected to and in communication with base stations 120. MSC 118 can connect a call voice path between one of base stations 120 and another terminating device such as communication devices 108 in communication with Wi-Fi gateway VLR 102. MSC 118 and base stations 120 can operate together for communicating calls to communication devices 122.

MSC 118 can access HLR 116 via a MAP interface 124 and implement a MAP protocol for communicating with HLR 116. MAP interface 124 can pass routing information from HLR 116 to the rest of the packet switched core network and support any mobility management related database in HLR 116. MAP interface 124 can also be implemented over a SS7 signaling network or over IP protocol (MAP over IP).

HLR 116 can also contain information about the location of communication devices 108 and 122, for example, information about the geographic area in which the communication device is located. In one embodiment, HLR 116 can store information indicating that a subscriber using one of communication devices 108 is reachable via Wi-Fi gateway VLR function 126 of Wi-Fi gateway VLR 102. In this case, function 126 includes information indicating one of APs 110 having communication with the subscriber. As the subscriber moves around to different APs 110, the data in function 126 can be updated accordingly.

In addition, a VLR 128 associated with MSC 118 can maintain a database containing information about all the communication devices currently located in the area associated with MSC 118. When one of communication devices 122 roams into a new MSC area, a VLR connected to the new MSC can request data about the communication device from HLR 116 responsible for the communication device. The VLR may also inform the home HLR 116 of the reachability or location of the roaming subscriber. By allowing the VLR/MSC in the new area to communicate with the HLR responsible for the communication devices, the VLR in the new MSC area can have the information necessary to assist the communication device in performing its functions.

Wi-Fi network 104 can include a packet switching system, such as a media gateway controller (MGC) and one or more associated media gateway (MG) elements 130, and Wi-Fi gateway VLR 102 can include a SIP server 132 for handling the conversion of a call from Time Division Multiplexing (TDM) to Voice Over IP (VoIP). For example, SIP server 132 may perform SIP signaling functions for VoIP calls, and MGC/MG 130 may convert TDM-based call media streams to packet-based media streams, and vice versa. Wi-Fi gateway VLR function 126 can include a mapping or routing table to provide information on the current IP address of the subscriber. A call can be completed to communication device 108 using VoIP.

Wi-Fi gateway VLR 102 can include a Wi-Fi gateway VLR function 126 for tracking and registering the communication devices roaming in the service area of Wi-Fi network 104. More particularly, Wi-Fi gateway VLR function 126 is adapted to track and register those subscribers that have been granted combined Wi-Fi/GSM network access rights. For example, a Wi-Fi gateway VLR function may track and process those subscribers that have been granted Wi-Fi/GSM service. A Wi-Fi gateway VLR function may include a database of provisioned dual network subscribers, such as the data shown in Tables 1 and 2 below. In the example shown in Table 1, dual network Wi-Fi/GSM subscribers are identified by a GSM IMSI value. In the example of Table 2, dual network Wi-Fi/GSM subscribers are identified by either a GSM IMSI value or a Wi-Fi identifier such as an IP address, a MAC address, or other network identifier.

TABLE 1

Dual Network Subscriber List

| IMSI |
| --- |
| 312332121255555 |
| 312332121255567 |
| 312332121255435 |

TABLE 2

Dual Network Subscriber List with Wi-Fi ID

| Wi-Fi ID | IMSI |
| --- | --- |
| 100.100.10.10 | 312332121255555 |
| 100.100.10.11 | 312332121255567 |
| 100.100.10.20 | 312332121255435 |

Wi-Fi gateway VLR function 126 includes a database for storing information regarding a wireless subscriber to GSM network 106. According to one embodiment, Wi-Fi gateway VLR function 126 can store location and billing information for a wireless subscriber to GSM network 106. Wi-Fi gateway VLR function 126 is also adapted to associate a temporary cellular network identifier, such as a GSM mobile subscriber roaming number (MSRN) with a dual network subscriber that has roamed into the service area of the Wi-Fi gateway VLR function.

A Wi-Fi gateway VLR function may maintain a subscriber Wi-Fi/GSM mapping table. Table 3 below shows data in an exemplary subscriber Wi-Fi/GSM mapping table.

TABLE 3

Exemplary Subscriber Wi-Fi/GSM Mapping Information

| IMSI | MSRN | Serving MGC ID | Serving Access Point ID | Real IP Address | Alias IP Address |
|---|---|---|---|---|---|
| 312332121255555 | 9193452020 | 9191001111 | 100.255.50.50 | 1.234.56.789 | 1.123.45.678 |
| 312332121255567 | 9193452021 | 9191001111 | 100.255.50.51 | 1.345.67.890 | 1.456.78.910 |

While the subscriber is active in Wi-Fi network 104 and within the service area of Wi-Fi gateway VLR function 126, the subscriber's Wi-Fi reachability information (e.g., serving Access Point identifier) may be maintained at Wi-Fi gateway VLR function 126. Each time that a subscriber roams from one Wi-Fi access point to another Wi-Fi access point, an HLR update is not required. An HLR update is only required if the subscriber roams into a service area controlled by a different Wi-Fi gateway VLR, or if the subscriber leaves the Wi-Fi network (roams out, or de-activates). Thus, one benefit of the subject matter disclosed herein is a significant reduction in the volume of mobility management signaling traffic between the access network (i.e., Wi-Fi network) and core elements of the cellular network (e.g., HLR).

Figure 2:
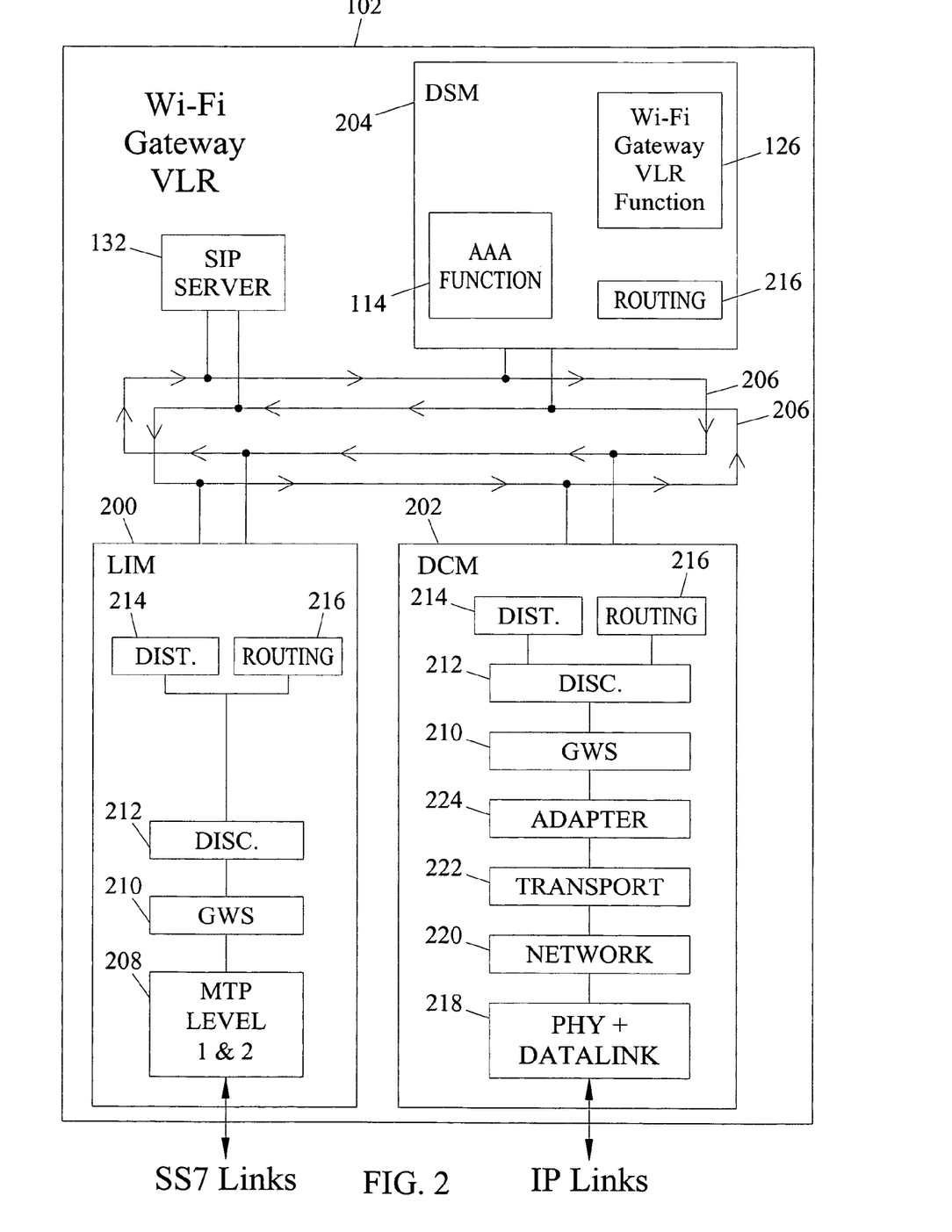
FIG. 2 is a block diagram illustrating an exemplary internal architecture of a Wi-Fi gateway Visitor Location Register (VLR) for implementing the integration of a Wi-Fi network and a GSM network according to an embodiment of the subject matter described herein.

FIG. 2 is a block diagram illustrating an exemplary internal architecture of Wi-Fi gateway VLR 102 for implementing the integration of Wi-Fi network 104 (FIG. 1) and GSM network 106 (FIG. 1) according to one embodiment. Referring to FIG. 2, Wi-Fi gateway 102 includes a plurality of processing modules 200, 202, and 204 coupled to each other via a counter rotating dual ring bus 206. From a hardware perspective, each module 200, 202, and 204 may include an application processor for performing application level functions and a communications processor for communicating with other processing modules via bus 206. From a software perspective, each module 200, 202, and 204 may include telecommunications software applications for performing various telecommunications routing and processing functions.

In the illustrated example, module 200 is a Link Interface Module (LIM) for sending and receiving SS7 messages over SS7 signaling links. For example, LIM module 200 can communicate with HLR 116 by sending SS7 messages over the SS7 signaling links. A LIM may include an MTP level 1 and 2 function 208, a gateway screening function 210, a discrimination function 212, a distribution function 214, and a routing function 216. MTP level 1 and 2 function 208 performs MTP level 1 and 2 operations, such as sequencing of SS7 signaling messages, error correction, and error detection. Gateway screening function 210 screens SS7 signaling messages based on originating and/or destination point code values to determine whether or not to allow the signaling messages into a network. Discrimination function 212 determines whether received SS7 messages are addressed to the point code of Wi-Fi gateway 100 or to an external point code. If discrimination function 212 determines that a message is addressed to the point code of Wi-Fi gateway 100, discrimination function 212 forwards the signaling message to distribution function 214. If discrimination function 212 determines that a message is addressed to an external point code, discrimination function 212 forwards the signaling message to routing function 216.

Distribution function 214 distributes messages that are identified by discrimination function 212 as requiring further internal processing. For example, distribution function 214 may forward messages addressed to the point code of Wi-Fi gateway 100 to one of a plurality of identically provisioned DSM modules 204 for global title translation (GTT) processing. Routing function 216 includes MTP routing tables for routing messages to the card associated with the outbound signaling link for messages that are identified by discrimination function 212 as being addressed to an external signaling link.

Module 202 is a data communications module (DCM) for sending and receiving SS7 messages over IP signaling links. DCM 202 includes a physical and datalink layer 218, a network layer 220, a transport layer 222, and layers 210 through 216 that are identical to the corresponding layers of LIM 200. Physical and datalink layer 218 performs OSI physical and datalink layer functions, such as framing, error detection and correction, and modulation/demodulation required to send and receive signals over a physical medium. Network layer 220 performs network layer functions, such as IP routing. Transport layer 222 performs functions for ensuring reliable delivery of messages over an unreliable network. Transport layer 222 may implement any suitable transport protocol, such as TCP, SCTP, or UDP. Adaptation layer 224 performs functions for sending and receiving SS7 messages over an underlying IP network. In one example, adaptation layer 224 may implement MTP level 3 user adaptation (M3UA) layer, as described in the correspondingly named IETF RFC. Alternatively, adaptation layer may implement M2PA, SUA, TALI, or other suitable adaptation layer as described in the corresponding IETF RFCS.

In FIG. 2, module 204 is a database services module that includes that includes Wi-Fi gateway VLR function 126 and AAA function 114. As noted above, the function of Wi-Fi gateway VLR 126 includes a database for storing information regarding a wireless subscriber to GSM network 106 (FIG. 1). A Wi-Fi gateway VLR may also store Wi-Fi contact information or reachability information for a dual network subscriber that is roaming in a Wi-Fi network, so that a call originated in the PSTN or a cellular network can be efficiently routed to the appropriate access point that is serving the called party. Wi-Fi gateway VLR function 126 can store location and billing information for a wireless subscriber to GSM network 106 when a subscriber is roaming within the service area of Wi-Fi network 104. AAA function 114 can provide AAA services to the GSM subscriber. For example, Wi-Fi gateway VLR function 126 can store location information regarding the hotspot in which a WLAN communication device 108 is located or the access point serving device 108. AAA function 114 may facilitate authentication of WLAN communication devices seeking to access GSM network 106.

Figure 3A:
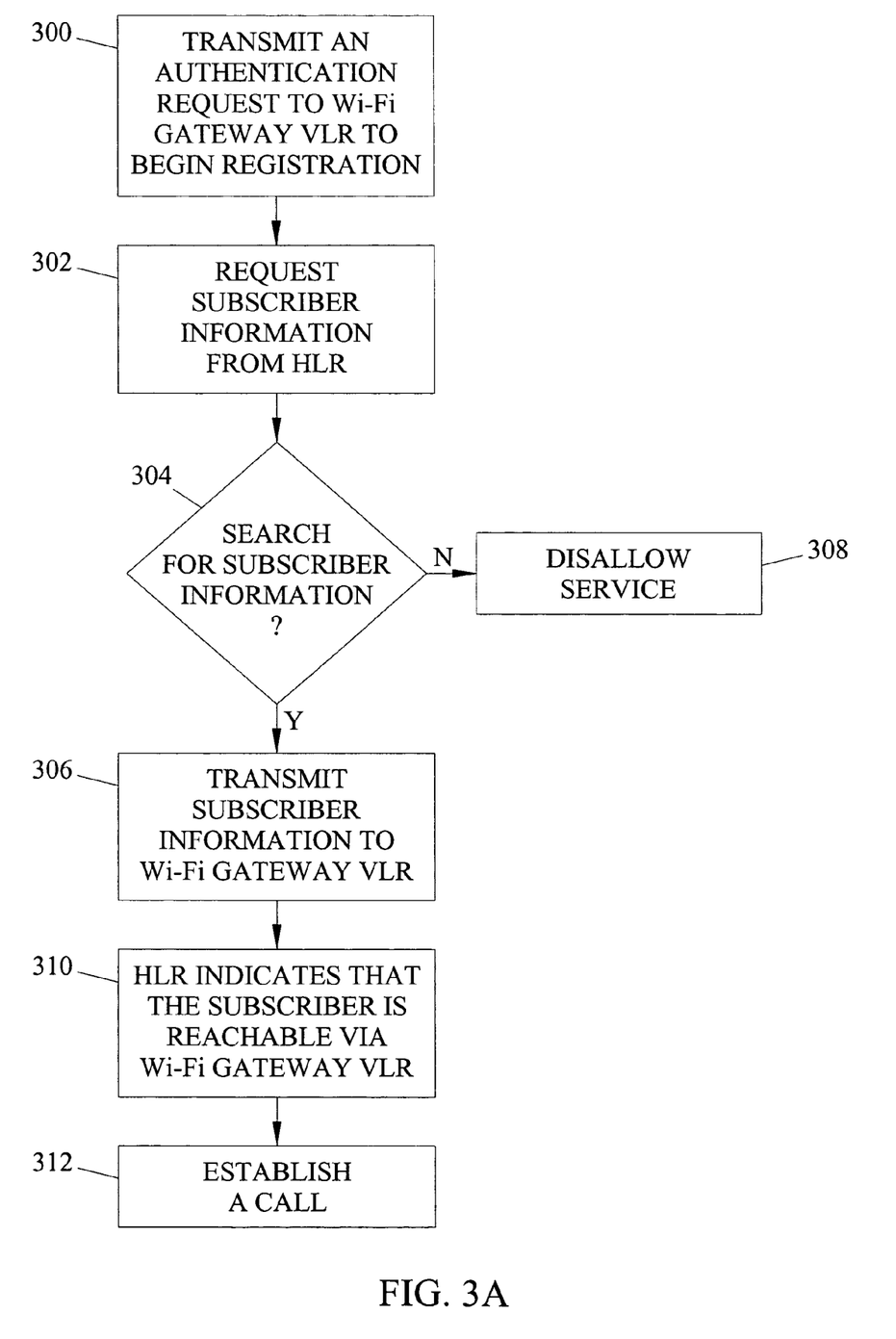
FIG. 3A is a flow chart illustrating an exemplary process for registering a roaming GSM subscriber with a Wi-Fi gateway VLR and originating a call according to an embodiment of the subject matter described herein.

Wi-Fi gateway VLR 102 can register a GSM subscriber roaming in the service area of Wi-Fi network 104. The GSM subscriber can be registered to Wi-Fi gateway VLR function 126. FIG. 3A is a flow chart illustrating an exemplary process for registering a roaming GSM subscriber with Wi-Fi gateway VLR function 126 and originating a call. Referring to FIG. 3A, the process can begin at step 300 when a GSM subscriber transmits an authentication request to AAA functionality 114 of Wi-Fi gateway VLR 102 to begin registration. The subscriber can be one of communication devices 108 having a subscription to the service provided by GSM network 106. According to one embodiment, Wi-Fi network 104 can utilize an authentication protocol such as RADIUS for authenticating the subscriber. AP 110 can forward the authentication request in RADIUS protocol to AAA function 114. According to one embodiment, AAA function 114 can be RADIUS-enabled and operable to convert the RADIUS protocol to MAP protocol for communication with GSM network 106. Wi-Fi gateway VLR 102 and HLR 116 can communicate via an SS7 interface. When Wi-Fi gateway VLR function 126 receives the request, function 126 can request information for the subscriber from HLR 116 (FIG. 1) (step 302).

Next, at step 304, HLR 116 can search its database for the subscriber information. If HLR 116 locates the subscriber information, the information can be transmitted to the subscriber information to Wi-Fi gateway VLR function 126 (step 306). If the subscriber information for the subscriber is not found or the subscriber is disallowed, HLR 116 may disallow the use of Wi-Fi network 104 to the subscriber and indicate disallowance to Wi-Fi gateway VLR 102 (step 308). HLR 116 can also store information indicating that the subscriber is reachable via function 126 (step 310). Once the subscriber has been registered with VLR 126, the subscriber can communicate with Wi-Fi gateway VLR 102 to establish a call (step 312).

By maintaining subscriber information at Wi-Fi gateway VLR function 126, the subscriber can roam between APs 110 without re-registering with HLR 116. Function 126 can maintain information indicating the specific AP 110 by which the subscriber can be accessed. Thus, function 126 contains routing information for transmitting calls to the subscriber. If the subscriber moves to a service area of a different AP 110, the routing information in function 126 is updated accordingly. Re-registration with HLR 116 is not necessary when the subscriber moves to a different AP 110 because function 126 contains the updated information.

The subscriber can also roam into an area serviced by GSM network 106. When the subscriber roams into the GSM service area, HLR 116 can be updated with information indicating that the subscriber is reachable via one of base stations 120. If the subscriber is no longer reachable via Wi-Fi network 104, the information associated with the subscriber may be removed by Wi-Fi gateway VLR function 126.

Figure 3B:
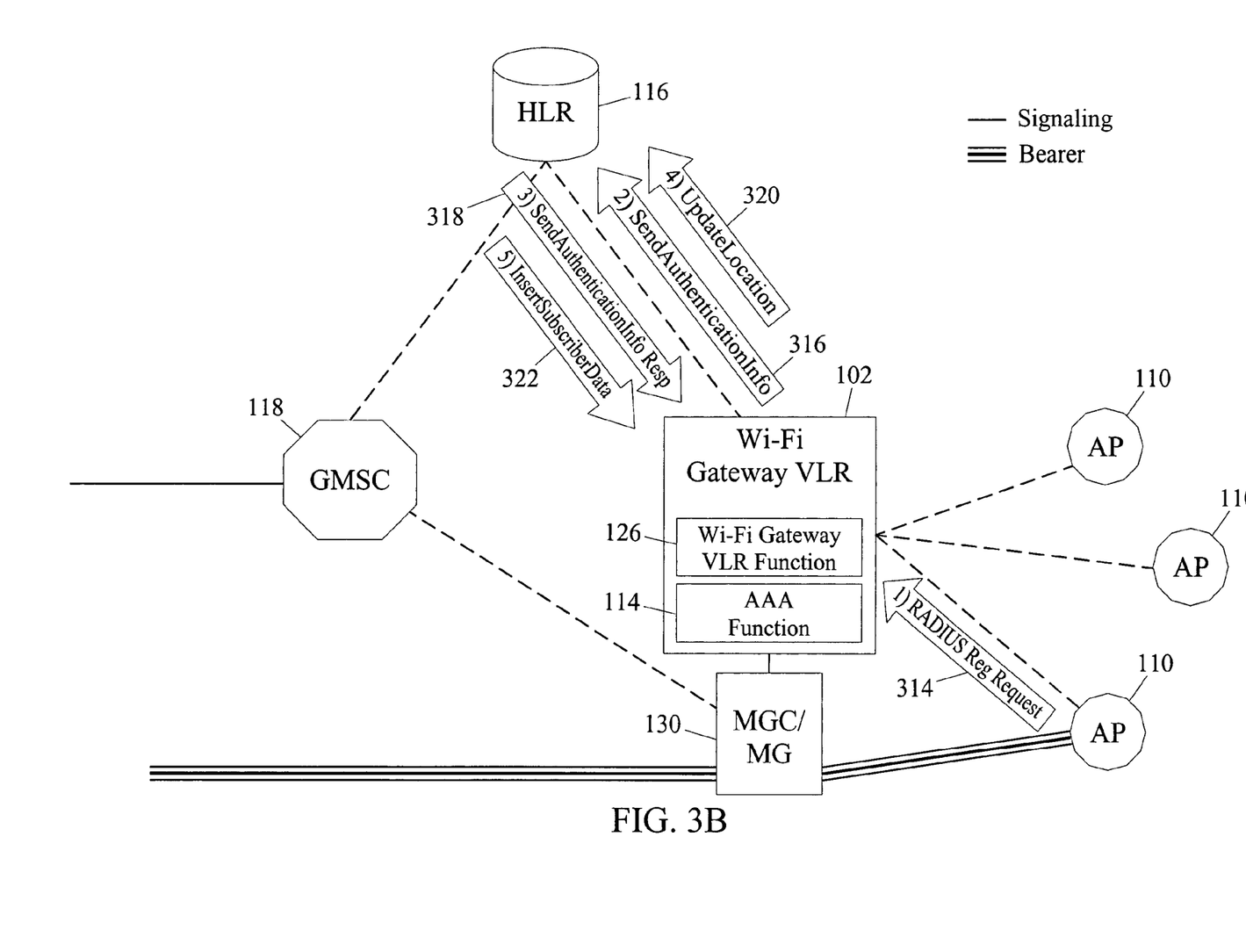
FIG. 3B is a schematic diagram of an example of the transmission of signaling messages for registering a roaming GSM subscriber with a Wi-Fi gateway VLR and originating a call.

FIG. 3B is a schematic diagram illustrating an example of the transmission of signaling messages for registering a roaming GSM subscriber with Wi-Fi gateway VLR function 126 and originating a call. The process can begin when a dual GSM/Wi-Fi subscriber transmits a request to access point 110 to begin registration. Referring to FIG. 3B, access point 110 forwards a RADIUS Registration Request message 314 to virtual VLR 126 for the subscriber. Message 314 includes the subscriber's GSM IMSI identifier. Based on the subscriber's GSM IMSI identifier, function 126 generates a SendAuthenticationinfo message 316 for requesting authentication information for the subscriber from the subscriber's HLR 116. Next, function 126 forwards SendAuthenticationinfo message 316 to HLR 116.

Referring to FIG. 3B, in response to receiving message 316, HLR 116 can search its database for a set of authentication vectors. If HLR 116 locates the set of authentication vectors, HLR 116 generates a SendAuthenticationinfo response message 318 including the set of authentication vectors. Message 318 can be forwarded to AAA function 114 in Wi-Fi gateway VLR 102 for authenticating the subscriber in the GSM domain. If authentication is successful, Wi-Fi gateway VLR function 126 generates and forwards an Update Location message 320 including subscriber information to HLR 116. Next, HLR 116 generates a GSM InsertSubscriberData message 322 including the subscriber information.

Figure 4A:
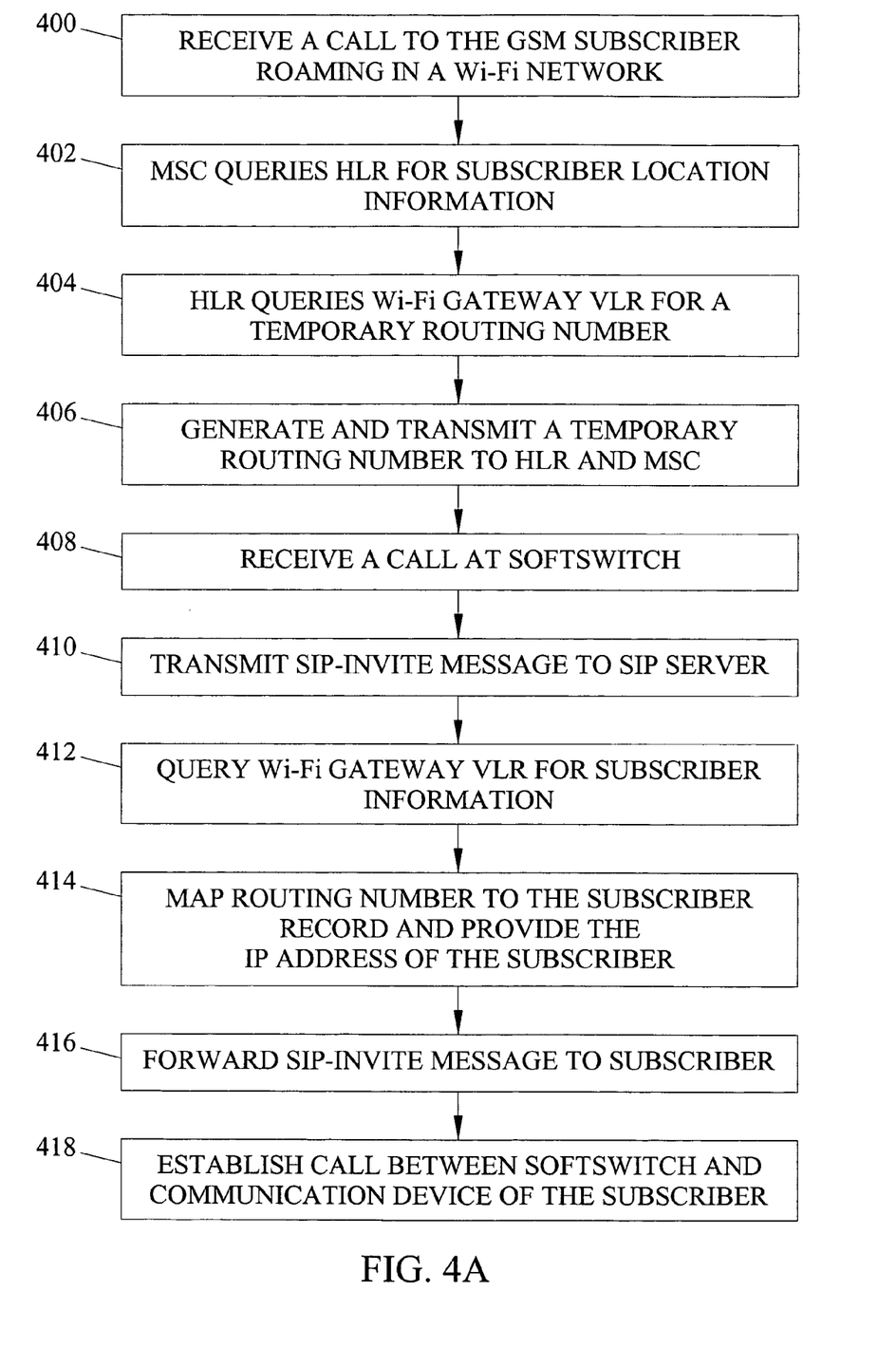
FIG. 4A is a flow chart illustrating an exemplary process for handling a subscriber call originating at a PSTN and terminating at a GSM/Wi-Fi subscriber currently roaming in a Wi-Fi network according to the embodiment of the subject matter described herein.

When a call is received to the GSM number associated with the subscriber, HLR 116 is queried to locate the subscriber. HLR 116 contains information indicating that the subscriber is not available, located in an area serviced by GSM network 106, or that Wi-Fi gateway VLR function 126 has routing information regarding the subscriber. If the subscriber is located in an area serviced by Wi-Fi network 104, HLR 116 can query function 126 for information to route the call to the subscriber via Wi-Fi network 104. FIG. 4A is a flow chart illustrating an exemplary process for handling a subscriber call originating at PSTN 112 and terminating at GSM/Wi-Fi subscriber currently roaming in Wi-Fi network 104. In this example, the roaming subscriber is communication device 108 having a subscription with GSM network 106. Referring to FIG. 4A, the process can begin at step 400 when a call setup request from PSTN 112 is received by MSC 118 (FIG. 1) for the GSM number associated with the subscriber roaming in Wi-Fi network 104.

At step 402, MSC 118 can query HLR 116 (FIGS. 1 and 2) for subscriber location information. Next, HLR 116 can query Wi-Fi gateway VLR function 126 for a temporary routing number (step 404). Wi-Fi gateway 102 can then generate a temporary routing number and transmit the routing number to HLR 116 and MSC 118 (step 406). The routing number can be associated with MGC/MG 130. Function 126 can also update an internal table to map the temporary routing number to the roaming subscriber.

Referring to FIG. 4A, MSC 118 can route the call to the temporary routing number and MGC/MG 130 can receive the call (step 408). MGC/MG 130 can then transmit a SIP-INVITE message to SIP server 132 (step 410). Upon receipt of the SIP-INVITE message, SIP server 132 can query virtual VLR 126 for the subscriber information (step 412). Next, at step 414, virtual VLR 126 can map the routing number to the subscriber record and provide the IP address of the subscriber. At step 416, the SIP-INVITE message can then be forwarded to the subscriber over an IP network, i.e., via access point 110. Next, at step 418, a call can be established between MGC/MG 130 and communication device 108 associated with the subscriber using standard SIP and VoIP protocol.

HLR 116 can also include user-defined preferences set to communicate with communication device 108 via Wi-Fi network 104 or GSM network 106. Preferences can be set with a Web Browser, sending a SMS-type message, Interactive Voice Response (IVR) technology, or another suitable method known to those of skill in the art. Assuming communication is available through both networks, the preferences for a subscriber can be set to communicate messages through one of networks 104 and 106. If the preference is GSM network 106, communications via GSM network 106 can be implemented as known to those of skill in the art. If the preference is Wi-Fi network 104, communication can be implemented with Wi-Fi gateway VLR function 126 as described herein.

Wi-Fi gateway VLR 102 is operable to receive Mobile Terminated-SMS (MT-SMS) messages and transmit Mobile Originated-SMS (MO-SMS) messages. In order to transmit a SMS message, communication device 108 can initiate transmission of a SMS message. In one embodiment, communication device 108 can be Internet-enabled for transmitting the SMS message through the Internet. Once the SMS message is transmitted through the Internet, it is received by a GSM Short Message Center (SMC), which can transmit the SMS message to the appropriate mobile device. Short Message Peer-to-Peer (SMPP) is a communication protocol for communicating between the Internet and a SMC.

Figure 4B:
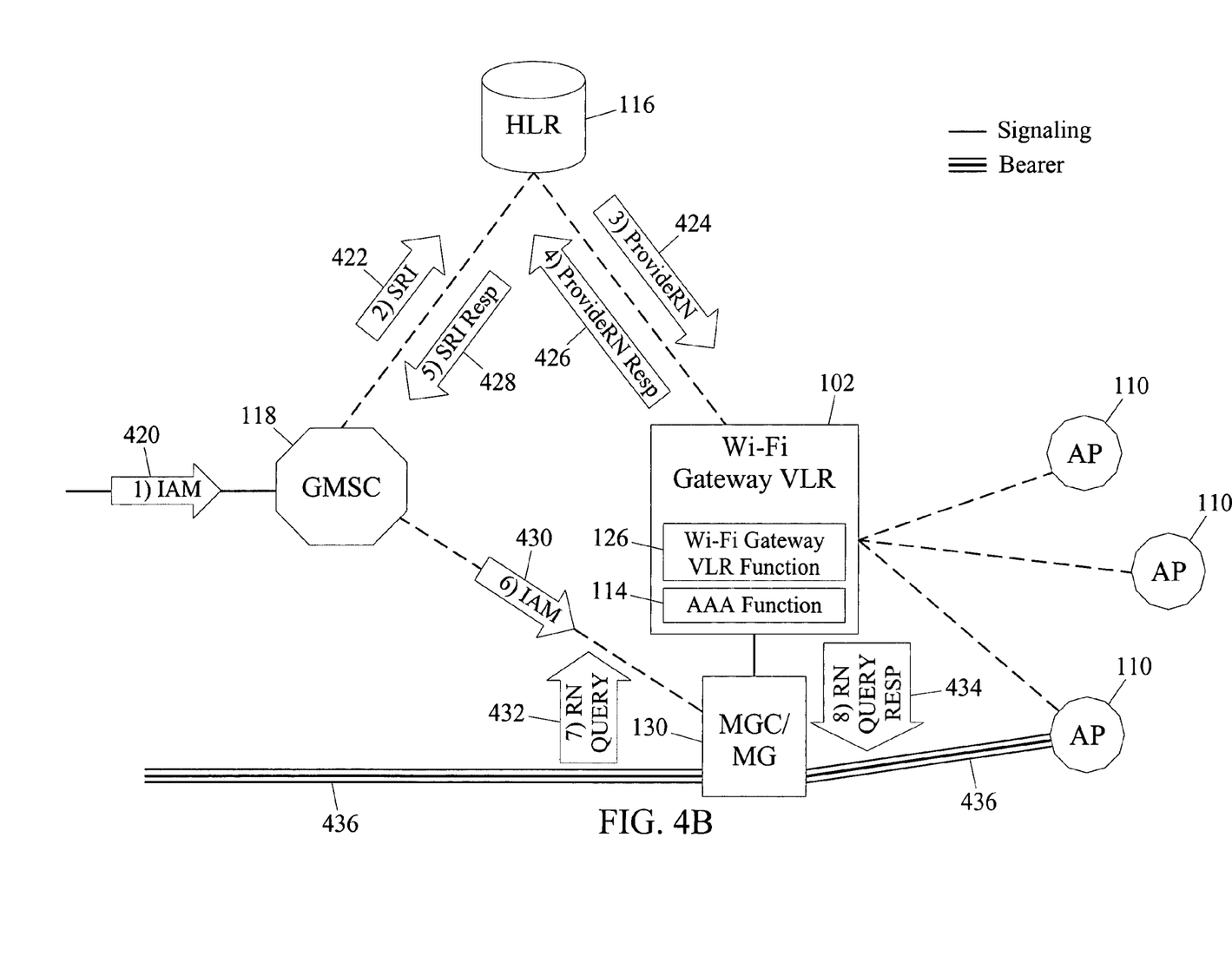
FIG. 4B is a schematic diagram illustrating an example of the transmission of signaling messages for handling a subscriber call originating at Public Switched Telephone Network (PSTN) and terminating at a GSM/Wi-Fi subscriber currently roaming in a Wi-Fi network.

FIG. 4B is a schematic diagram illustrating an example of the transmission of signaling messages for handling a dual GSM/Wi-Fi subscriber call originating at PSTN 112 and terminating at a GSM/Wi-Fi subscriber currently roaming in Wi-Fi network 104. In this example, the roaming subscriber has a subscription with GSM network 106. Referring to FIG. 4B, the process can be initiated when GMSC 118 receives an IAM 420 including a called party number associated with an incoming call for the subscriber. Based on the called party number in IAM 420, GMSC 118 queries the called party subscriber's HLR 116 with a GSM SendRoutingInformation query message 422. HLR 116 may include information from Wi-Fi gateway VLR function 126 that indicates that the called party subscriber is in the service area of function 126. Based on this information, HLR 116 queries function 126 with a GSM ProvideRoamingNumber query message 424 for requesting a roaming number for the subscriber. In response to receiving message 424, function 126 assigns the called party subscriber a temporary roaming number indicating that the call should be routed to MGC/MG 130 and returns the temporary roaming number to HLR 116 in a GSM ProvideRoamingNumber response message 426. HLR 116 can receive message 426 and provide the temporary roaming number in message 426 to GMSC 118 in a SendRoutingInformation response message 428. Using the roaming number provided in message 428, GMSC 118 can route an IAM 430 to MGC/MG 130 for setting up a call to the called party subscriber. IAM 430 can include the temporary roaming number.

In response to receiving IAM 430 for setting up the call, MGC/MG 130 transmits a roaming number query message 432 to Wi-Fi gateway VLR function 126 including the temporary roaming number. As stated above, function 126 can include reachability information for mapping the temporary roaming number for the subscriber to one of access points 110. In response to receiving message 432, function 126 can search a mapping table that maps the roaming number to an access point identifier that identifies the particular access point 110 servicing the subscriber. Next, function 126 a roaming number response message 434 including the access point identifier to MGC/MG 130. MGC/MG 130 can utilize the access point identifier for setting up the call on bearer channels 436 to the identified access point 110.

As stated above, while the subscriber is active in Wi-Fi network 104 and within the service area of Wi-Fi gateway VLR function 126, the subscriber's Wi-Fi reachability information at one of access points 110 may be maintained at virtual VLR 126. Thus, the Wi-Fi gateway VLR may perform VLR functions (such as registration and authorization) on behalf of one or more access points. Providing a Wi-Fi gateway VLR that performs VLR functions on behalf of one or more access points is advantageous over wireless networks that require VLR functionality to be provided at each wireless office. The subject matter described herein enables communication with subscribers roaming in Wi-Fi networks without requiring that the Wi-Fi access points implement VLR functions.

Figure 5:
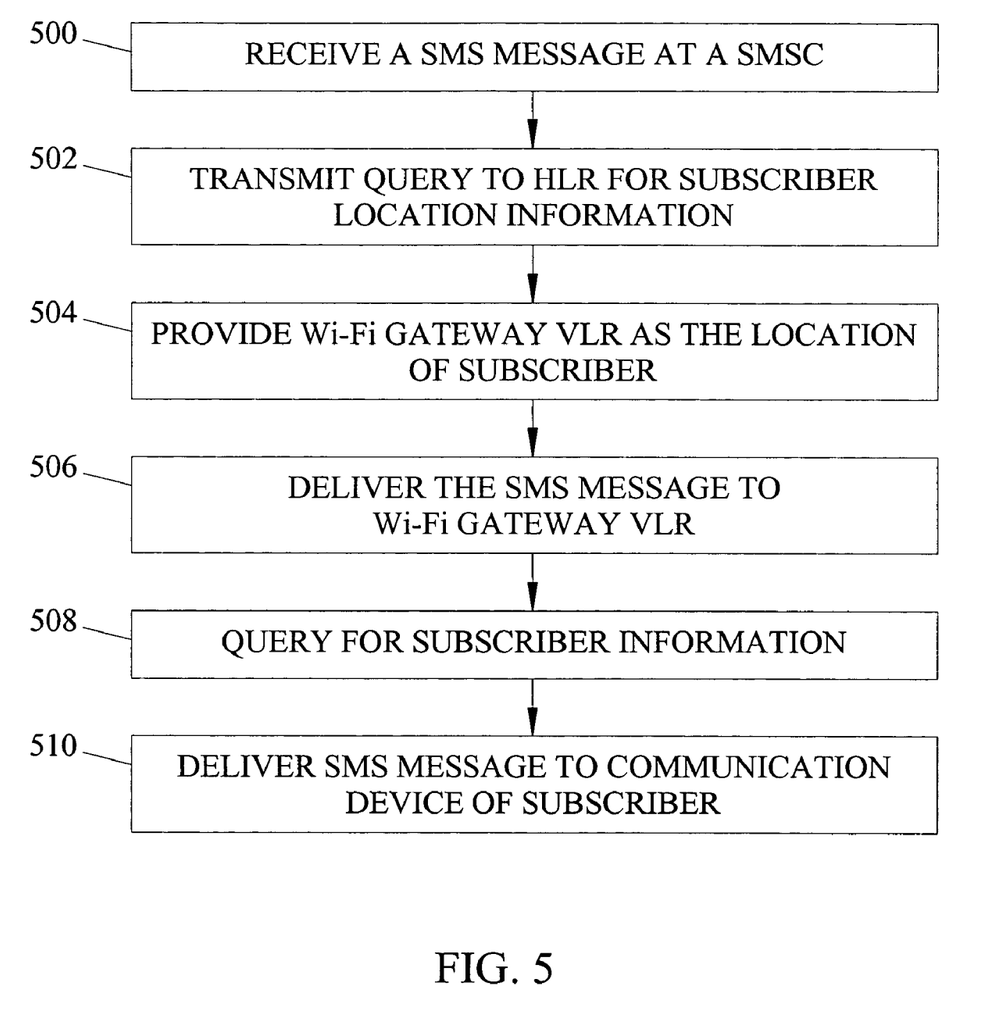
FIG. 5 is a flow chart illustrating an exemplary process for terminating a Short Message Service (SMS) message to a GSM/Wi-Fi subscriber roaming in a Wi-Fi network according to an embodiment of the subject matter described herein.

SMC can also receive a SMS message for delivery to communication device 108. FIG. 5 is a flow chart illustrating an exemplary process for terminating an SMS message to a GSM/Wi-Fi subscriber roaming in Wi-Fi network 104. Referring to FIG. 5, the process can begin at step 500 when an SMS message is received at a short message service center (SMSC). The SMC can then transmit a query to HLR 116 for subscriber location information (step 502). Next, at step 504, HLR 116 can provide Wi-Fi gateway VLR function 126 as the location where the subscriber is being served. Function 126 can identify the location of communication device 108 of the subscriber. HLR 116 can then transmit the routing information for communication device 108 to the SMC. At step 506, the SMC can then deliver the SMS message to communication device 108 based on the routing information and using MAP protocols. Next, function 126 can query an internal table for the subscriber information (step 508). The SMS message can then be delivered to the IP address of communication device 108 of subscriber using Internet Protocol (step 510).

In one embodiment, Wi-Fi gateway VLR 102 is operable to route General Packet Radio Service (GPRS) packet data to communication device 108. GPRS is an IP transport network standard used by GSM network 106. Once an IP address of communication device 108 is known, a message can be sent to the device irrespective of the type of underlying transport network. The underlying IP transport networks may be GPRS, Code-Division Multiple Access (CDMA), or IP network.

Thus, as described above, the subject matter disclosed herein includes methods, gateways, and computer program products for registering a roaming subscriber in a wireless local area network, such as a Wi-Fi network, and for establishing a communication to a roaming subscriber in a wireless local area network. The method can occur at a Wi-Fi gateway VLR between a Wi-Fi network and a cellular network. According to the method, a registration request from a subscriber located in a service area of an access point in the Wi-Fi network may be received at a Wi-Fi gateway VLR located between the Wi-Fi network and a cellular network. In response to the registration, the subscriber can be authenticated with an HLR associated with the cellular network. Information associated with the subscriber may be received from the HLR. The information associated with the subscriber may be stored in a Wi-Fi gateway VLR associated with the Wi-Fi network. Wi-Fi reachability information for sending media packets to the subscriber may also be stored in the Wi-Fi gateway VLR. The methods, gateways, and computer program products disclosed herein can improve the integration of Wi-Fi network and cellular network based systems by providing seamless roaming.

It will be understood that various details of the invention may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing Wireless-Fidelity (Wi-Fi) gateway visitor location register (VLR) functionality for at least one access point in a Wi-Fi network, the method comprising:

(a) providing a Wi-Fi gateway VLR for performing VLR functions for at least one access point in a Wi-Fi network, wherein performing VLR functions includes:
  (i) receiving a registration request from a subscriber located in a service area of an access point in the Wi-Fi network;
  (ii) authenticating the subscriber with a home location register (HLR) associated with the cellular network;
  (iii) receiving information associated with the subscriber from the HLR;
  (iv) storing the information associated with the subscriber in the Wi-Fi gateway VLR; and
  (v) maintaining, in the Wi-Fi gateway VLR, Wi-Fi reachability information for sending media packets to the subscriber in the Wi-Fi network;
wherein maintaining Wi-Fi reachability information includes maintaining information regarding a Wi-Fi access point that is serving the subscriber, wherein maintaining information regarding a Wi-Fi access point that is serving the subscriber includes updating the reachability information when the subscriber moves from a first Wi-Fi access point to a second Wi-Fi access point served by the Wi-Fi gateway VLR.

2. The method of claim 1 wherein the cellular network comprises a GSM network.

3. The method of claim 1 wherein receiving a registration request is implemented using a remote authentication dial-in user service (RADIUS) protocol.

4. The method of claim 1 wherein performing VLR functions includes generating a usage and measurements record associated with a subscriber registration transaction.

5. The method of claim 1 wherein authenticating the subscriber comprises communicating with the HLR via an SS7 interface.

6. The method of claim 1 wherein receiving information associated with the subscriber from the HLR includes receiving billing information for the subscriber.

7. The method of claim 1 wherein receiving information associated with the subscriber from the HLR includes receiving authentication information for the subscriber.

8. The method of claim 1 wherein maintaining information regarding an access point that is serving the subscriber includes updating the Wi-Fi gateway VLR with information identifying the serving access point without forwarding new reachability information to the HLR.

9. The method of claim 1 comprising establishing a call with the subscriber using the reachability information stored for the subscriber in the Wi-Fi gateway VLR.

10. The method of claim 9 wherein establishing a call with the subscriber includes:
  at a Gateway Mobile Switching Center (GMSC):
  (a) receiving a call setup request for establishing the call with the subscriber and
  (b) in response to receiving the call setup request, forwarding a message to the HLR for requesting routing information associated with the subscriber.

11. The method of claim 10 wherein establishing a call with the subscriber includes:
  (a) at the HLR:
    (i) generating a roaming number query for requesting a roaming number for the subscriber; and
    (ii) communicating the roaming number query to the Wi-Fi gateway VLR;
  (b) at the Wi-Fi gateway VLR:
    (i) generating a first response message including a roaming number associated with the subscriber for routing the call setup request to a media gateway controller; and
    (ii) communicating the first response message to the HLR; and
  (c) at the HLR, communicating a second response message to the GSMC, the second response message including the roaming number.

12. The method of claim 11 wherein establishing a call with the subscriber includes:
  (a) at the Wi-Fi gateway VLR, maintaining a mapping between a temporary roaming number associated with the subscriber and an access point identifier that identifies the access point servicing the subscriber
  (b) at the GSMC:
    (i) receiving the second response message including the temporary roaming number; and
    (ii) routing the call setup request to the media gateway controller based on the temporary roaming number;
  (c) at the media gateway controller:
    (i) receiving the call setup request from the GSMC;
    (ii) in response to receiving the call setup request, querying the Wi-Fi gateway VLR to determine the access point serving the subscriber; and
  (d) setting up a call with the subscriber at the serving access point.

13. The method of claim 9 wherein establishing a call with the subscriber includes generating billing information for the call.

14. The method of claim 13 wherein generating billing information comprises generating a call detail record (CDR).

15. The method of claim 13 comprising generating, at the Wi-Fi gateway VLR, a usage measurements record associated with the call.

16. The method of claim 1 comprising establishing SMS communication with the subscriber using the reachability information stored for the subscriber in the Wi-Fi gateway VLR.

17. A method for establishing a communication to a roaming subscriber in a Wireless-Fidelity (Wi-Fi) network, the method comprising:
  at a home location register (HLR) associated with a cellular network:
  (a) receiving registration information from a Wi-Fi gateway visitor location register (VLR) providing VLR functions for at least one access point in the Wi-Fi network, the VLR functions including receiving a registration request from a subscriber located in a service area of an access point in the Wi-Fi network, authenticating the subscriber with the HLR, and providing Wi-Fi reachability information for sending media packets to a subscriber being serviced by the at least one access point in the Wi-Fi network;
  (b) receiving a request from a first network for reachability information for the subscriber;
  (c) querying the Wi-Fi gateway VLR for routing information for the subscriber;
  (d) obtaining the routing information; and
  (e) providing the routing information to the first network
wherein the Wi-Fi gateway VLR is adapted to maintain reachability information regarding a Wi-Fi access point that is serving the subscriber, wherein maintaining reachability information regarding a Wi-Fi access point that is serving the subscriber includes updating the reachability information when the subscriber moves from a first Wi-Fi access point to a second Wi-Fi access point served by the Wi-Fi gateway VLR.

18. The method of claim 17 wherein the first network comprises a global systems for mobile communications (GSM) network.

19. The method of claim 17 wherein querying the Wi-Fi gateway VLR comprises communicating with the Wi-Fi gateway VLR via an SS7 interface.

20. The method of claim 17 comprising, at the first network, routing a call to the subscriber based on the routing information.

21. The method of claim 17 wherein routing a call to the subscriber includes:
at a Gateway Mobile Switching Center (GMSC):
(a) receiving a call setup request for establishing the call with the subscriber; and
(b) in response to receiving the call setup request, forwarding a message to the HLR for requesting routing information associated with the subscriber.

22. The method of claim 21 wherein routing a call to the subscriber includes:
(a) at the HLR:
(i) generating a roaming number query for requesting a roaming number for the subscriber; and
(ii) communicating the roaming number query to the Wi-Fi gateway VLR;
(b) at the Wi-Fi gateway VLR:
(i) generating a first response message including a roaming number associated with the subscriber for routing the call setup request to a media gateway controller; and
(ii) communicating the first response message to the HLR; and
(c) at the HLR, communicating a second response message to the GSMC, the second response message including the roaming number.

23. The method of claim 22 wherein routing a call to the subscriber includes:
(a) at the Wi-Fi gateway VLR, maintaining a mapping between a temporary roaming number associated with the subscriber and an access point identifier that identifies the access point servicing the subscriber;
(b) at the GSMC:
(i) receiving the second response message including the roaming number; and
(ii) routing the call setup request to the media gateway controller based on the roaming number;
(c) at the media gateway controller:
(i) receiving the call setup request from the GSMC;
(ii) querying the Wi-Fi gateway VLR to determine the access point serving the subscriber; and
(d) at the media gateway controller, setting up a call with the subscriber at the serving access.

24. The method of claim 17 comprising, at the first network, transmitting SMS messages to the subscriber based on the routing information.

25. The method of claim 17 comprising, at the first network, transmitting general packet radio service (GPRS) packet data to the subscriber based on the routing information.

26. The method of claim 17 wherein the Wi-Fi gateway VLR is adapted to update the reachability information without re-contacting the HLR when the subscriber moves from a first access point to a second access point served by the Wi-Fi gateway VLR.

27. A Wireless-Fidelity (Wi-Fi) gateway visitor location register (VLR) for providing Wi-Fi gateway VLR functionality for at least one access point in a Wi-Fi network, the Wi-Fi gateway VLR comprising:
(a) a communications module for sending and receiving signaling messages and for receiving a registration request from a subscriber located in a service area of an access point in a Wi-Fi network;
(b) an authentication function for authenticating the subscriber with a home location register (HLR) associated with a cellular network and receiving information associated with the subscriber from the HLR; and
(c) a Wi-Fi gateway VLR function for maintaining the information associated with the subscriber and for maintaining Wi-Fi reachability information for sending media packets to the subscriber in the Wi-Fi network;
wherein maintaining Wi-Fi reachability information includes maintaining information regarding a Wi-Fi access point that is serving the subscriber, wherein maintaining information regarding a Wi-Fi access point that is serving the subscriber includes updating the reachability information when the subscriber moves from a first Wi-Fi access point to a second Wi-Fi access point served by the Wi-Fi gateway VLR.

28. The Wi-Fi gateway VLR of claim 27 wherein the cellular network comprises a global system for mobile communications (GSM) network.

29. The Wi-Fi gateway VLR of claim 27 wherein the communications module is adapted to use a remote authentication dial-in user service (RADIUS) protocol for receiving the registration request.

30. The Wi-Fi gateway VLR of claim 27 wherein the authentication function is adapted to generate a usage and measurements record associated with a subscriber registration transaction.

31. The Wi-Fi gateway VLR of claim 27 wherein the authentication function is adapted to communicate with the HLR via an SS7 interface.

32. The Wi-Fi gateway VLR of claim 27 wherein the received information includes billing information for the subscriber.

33. The Wi-Fi gateway VLR of claim 27 wherein the received information includes authentication information for the subscriber.

34. The Wi-Fi gateway VLR of claim 27 wherein the Wi-Fi gateway VLR function is adapted to update the reachability information when the subscriber moves between access points.

35. The Wi-Fi gateway VLR of claim 34 wherein the Wi-Fi gateway VLR function is adapted to update the reachability information without contacting the HLR.

36. The Wi-Fi gateway VLR of claim 27 wherein the authentication function is adapted to generate billing information associated with a call for the subscriber.

37. The Wi-Fi gateway VLR of claim 36 wherein the billing information includes a call detail record (CDR).

38. The Wi-Fi gateway VLR of claim 27 wherein the authentication function is adapted to generate a usage measurements record associated with the registration request.

39. The Wi-Fi gateway VLR of claim 27 wherein the authentication function is adapted to generate a usage and measurements record associated with the subscriber call.

40. The Wi-Fi gateway VLR of claim 36 wherein the communication module is adapted to communicate short message service (SMS) messages with the subscriber.

41. The Wi-Fi gateway VLR of claim 36 wherein the Wi-Fi gateway VLR function is adapted to:
 (a) receive a roaming number query for requesting a roaming number for the subscriber; and
 (b) generate a response message including a roaming number associated with the subscriber for routing a call setup request to a media gateway controller.

42. The Wi-Fi gateway VLR of claim 41 wherein the Wi-Fi gateway VLR function is operable to:
 (a) maintain a mapping between a temporary roaming number associated with the subscriber and an access point identifier that identifies the access point servicing the subscriber;
 (b) receive, from a media gateway controller, a roaming number request for the subscriber; and
 (c) forward to the media gateway controller a request response including the access point identifier that identifies the access point servicing the subscriber.

43. A computer readable medium having stored thereon computer-executable instructions that when executed by a processor of a computer perform steps comprising:
 (a) providing a Wi-Fi gateway VLR for performing VLR functions for at least one access point in a Wi-Fi network, wherein performing VLR functions includes:
  (i) receiving a registration request from a subscriber located in a service area of an access point in the Wi-Fi network;
  (ii) authenticating the subscriber with a home location register (HLR) associated with the cellular network;
  (iii) receiving information associated with the subscriber from the HLR;
  (iv) storing the information associated with the subscriber in the Wi-Fi gateway VLR; and
  (v) maintaining, in the Wi-Fi gateway VLR, Wi-Fi reachability information for sending media packets to the subscriber in the Wi-Fi network;
 wherein maintaining Wi-Fi reachability information includes maintaining information regarding a Wi-Fi access point that is serving the subscriber, wherein maintaining information regarding a Wi-Fi access point that is serving the subscriber includes updating the reachability information when the subscriber moves from a first Wi-Fi access point to a second Wi-Fi access point served by the Wi-Fi gateway VLR.

44. The computer readable medium of claim 43 wherein the cellular network comprises a GSM network.

45. The computer readable medium of claim 43 wherein receiving a registration request is implemented using a remote authentication dial-in user service (RADIUS) protocol.

46. The computer readable medium of claim 43 wherein performing VLR functions includes generating a usage and measurements record associated with a subscriber registration transaction.

47. The computer readable medium of claim 43 wherein authenticating the subscriber comprises communicating with the HLR via an SS7 interface.

48. The computer readable medium of claim 43 wherein receiving information associated with the subscriber from the HLR includes receiving billing information for the subscriber.

49. The computer readable medium of claim 43 wherein receiving information associated with the subscriber from the HLR includes receiving authentication information for the subscriber.

50. The computer readable medium of claim 43 wherein maintaining information regarding an access point that is serving the subscriber includes updating the Wi-Fi gateway VLR with information identifying the serving access point without forwarding new reachability information to the HLR.

51. The computer readable medium of claim 43 comprising establishing a call with the subscriber using the reachability information stored for the subscriber in the Wi-Fi gateway VLR.

52. The computer readable medium of claim 51 wherein establishing a call with the subscriber includes:
 at a Gateway Mobile Switching Center (GMSC):
 (a) receiving a call setup request for establishing the call with the subscriber; and
 (b) in response to receiving the call setup request, forwarding a message to the HLR for requesting routing information associated with the subscriber.

53. The computer readable medium of claim 52 wherein establishing a call with the subscriber includes:
 (a) at the HLR:
  (i) generating a roaming number query for requesting a roaming number for the subscriber; and
  (ii) communicating the roaming number query to the Wi-Fi gateway VLR;
 (b) at the Wi-Fi gateway VLR:
  (i) generating a first response message including a roaming number associated with the subscriber for routing the call setup request to a media gateway controller; and
  (ii) communicating the first response message to the HLR; and
 (c) at the HLR, communicating a second response message to the GSMC, the second response message including the roaming number.

54. The computer readable medium of claim 53 wherein establishing a call with the subscriber includes:
 (a) at the Wi-Fi gateway VLR, maintaining a mapping between a temporary roaming number associated with the subscriber and an access point identifier that identifies the access point servicing the subscriber;
 (b) at the GSMC:
  (i) receiving the second response message including the temporary roaming number; and
  (ii) routing the call setup request to the media gateway controller based on the temporary roaming number;
 (c) at the media gateway controller:
  (i) receiving the call setup request from the GSMC;
  (ii) in response to receiving the call setup request, querying the Wi-Fi gateway VLR to determine the access point serving the subscriber; and
 (d) setting up a call with the subscriber at the serving access point.

55. The computer readable medium of claim 51 wherein establishing a call with the subscriber includes generating billing information for the call.

56. The computer readable medium of claim 55 wherein generating billing information comprises generating a call detail record (CDR).

57. The computer readable medium of claim 55 comprising generating, at the Wi-Fi gateway VLR, a usage measurements record associated with the call.

58. The computer readable medium of claim 43 comprising establishing SMS communication with the subscriber using the reachability information stored for the subscriber in the Wi-Fi gateway VLR.

59. A computer readable medium having stored thereon computer-executable instructions that when executed by a processor of a computer perform steps comprising:

at a home location register (HLR) associated with a cellular network:
 (a) receiving registration information from a Wi-Fi gateway visitor location register (VLR) providing VLR functions for at least one access point in the Wi-Fi network, the VLR functions include receiving a registration request from a subscriber located in a service area of an access point in the Wi-Fi network, authenticating the subscriber with the HLR, and providing Wi-Fi reachability information for sending media packets to a subscriber being serviced by the at least one access point in a Wi-Fi network;
 (b) receiving a request from a first network for reachability information for the subscriber;
 (c) querying the Wi-Fi gateway VLR for routing information for the subscriber;
 (d) obtaining the routing information; and
 (e) providing the routing information to the first network;
 wherein the Wi-Fi gateway VLR is adapted to maintain reachability information regarding a Wi-Fi access point that is serving the subscriber, wherein maintaining reachability information regarding a Wi-Fi access point that is serving the subscriber includes updating the reachability information when the subscriber moves from a first Wi-Fi access point to a second Wi-Fi access point served by the Wi-Fi gateway VLR.

60. The computer readable medium of claim 59 wherein the first network comprises a global systems for mobile communications (GSM) network.

61. The computer readable medium of claim 59 wherein querying the Wi-Fi gateway VLR comprises communicating with the Wi-Fi gateway VLR via an SS7 interface.

62. The computer readable medium of claim 59 comprising, at the first network, routing a call to the subscriber based on the routing information.

63. The computer readable medium of claim 59 wherein routing a call to the subscriber includes:
 at a Gateway Mobile Switching Center (GMSC):
 (a) receiving a call setup request for establishing the call with the subscriber; and
 (b) in response to receiving the call setup request, forwarding a message to the HLR for requesting routing information associated with the subscriber.

64. The computer readable medium of claim 63 wherein routing a call to the subscriber includes:
 (a) at the HLR:
  (i) generating a roaming number query for requesting a roaming number for the subscriber; and
  (ii) communicating the roaming number query to the Wi-Fi gateway VLR;
 (b) at the Wi-Fi gateway VLR:
  (i) generating a first response message including a roaming number associated with the subscriber for routing the call setup request to a media gateway controller; and
  (ii) communicating the first response message to the HLR; and
 (c) at the HLR, communicating a second response message to the GSMC, the second response message including the roaming number.

65. The computer readable medium of claim 64 wherein routing a call to the subscriber includes:
 (a) at the Wi-Fi gateway VLR, maintaining a mapping between a temporary roaming number associated with the subscriber and an access point identifier that identifies the access point servicing the subscriber;
 (b) at the GSMC:
  (i) receiving the second response message including the roaming number; and
  (ii) routing the call setup request to the media gateway controller based on the roaming number;
 (c) at the media gateway controller:
  (i) receiving the call setup request from the GSMC;
  (ii) querying the Wi-Fi gateway VLR to determine the access point serving the subscriber; and
 (d) at the media gateway controller, setting up a call with the subscriber at the serving access.

66. The computer readable medium of claim 59 comprising, at the first network, transmitting SMS messages to the subscriber based on the routing information.

67. The computer readable medium of claim 59 comprising, at the first network, transmitting general packet radio service (GPRS) packet data to the subscriber based on the routing information.

68. The computer readable medium of claim 59 wherein the Wi-Fi gateway VLR is adapted to update the reachability information without re-contacting the HLR.

\* \* \* \* \*